(12) United States Patent
Clarke et al.

(10) Patent No.: US 9,821,775 B2
(45) Date of Patent: Nov. 21, 2017

(54) VEHICLE TRANSMISSIONS HAVING A PARK FUNCTION

(75) Inventors: Richard Clarke, Coventry (GB); Simon Sutton, Coventry (GB); Kevin Holt, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 432 days.

(21) Appl. No.: 14/342,836

(22) PCT Filed: Sep. 4, 2012

(86) PCT No.: PCT/EP2012/067234
§ 371 (c)(1),
(2), (4) Date: Jun. 10, 2014

(87) PCT Pub. No.: WO2013/034559
PCT Pub. Date: Mar. 14, 2013

(65) Prior Publication Data
US 2014/0297139 A1 Oct. 2, 2014

(30) Foreign Application Priority Data
Sep. 5, 2011 (GB) .................................. 1115267.5

(51) Int. Cl.
| | |
|---|---|
| *B60T 1/00* | (2006.01) |
| *B60T 1/06* | (2006.01) |
| *B60W 10/18* | (2012.01) |
| *B60W 10/184* | (2012.01) |
| *F16H 63/48* | (2006.01) |

(Continued)

(52) U.S. Cl.
CPC .............. *B60T 1/005* (2013.01); *B60T 1/062* (2013.01); *F16H 63/486* (2013.01); *B60W 10/182* (2013.01); *B60W 10/184* (2013.01); *F16H 63/3416* (2013.01); *F16H 63/48* (2013.01); *F16H 2059/446* (2013.01)

(58) Field of Classification Search
None
See application file for complete search history.

(56) References Cited

U.S. PATENT DOCUMENTS

| | | |
|---|---|---|
| 2,875,856 A | 3/1959 | Mrlik |
| 3,043,403 A | 7/1962 | Kelley |
| 3,074,513 A | 1/1963 | Robinson |

(Continued)

FOREIGN PATENT DOCUMENTS

| | | |
|---|---|---|
| DE | 102005001838 A1 | 8/2006 |
| EP | 0891902 A1 | 1/1999 |

(Continued)

OTHER PUBLICATIONS

Combined Search and Examination Report under Sections 17 and 18(3) for Application No. GB1215774.9 dated Jan. 3, 2013.

(Continued)

*Primary Examiner* — Colby M Hansen
(74) *Attorney, Agent, or Firm* — Carlson, Gaskey & Olds

(57) ABSTRACT

In response to driver selection of PARK, a vehicle transmission is commanded to momentarily select and hold NEUTRAL before PARK, while a vehicle wheel brake is applied. Such an arrangement avoids trapping torque in the driveline, and thus can obviate pawl 'thump' when PARK is next disengaged.

11 Claims, 2 Drawing Sheets

(51) Int. Cl.
  *F16H 63/34*      (2006.01)
  *F16H 59/44*      (2006.01)

(56) References Cited

U.S. PATENT DOCUMENTS

| | | |
|---|---|---|
| 3,990,541 A | 11/1976 | Dobrinska et al. |
| 4,223,768 A | 9/1980 | Iwanaga |
| 4,930,609 A | 6/1990 | Bois et al. |
| 5,945,799 A | 8/1999 | Shimizu |
| 6,401,899 B1 | 6/2002 | Kanehisa et al. |
| 6,679,810 B1 * | 1/2004 | Boll ............ B60T 7/122 477/191 |
| 2004/0255706 A1 | 12/2004 | Bulgrien |
| 2007/0281827 A1 | 12/2007 | Shimizu et al. |
| 2011/0005891 A1 | 1/2011 | Hongawara et al. |
| 2011/0202246 A1 * | 8/2011 | Lindsay ............ B60T 1/005 701/70 |

FOREIGN PATENT DOCUMENTS

| | | | |
|---|---|---|---|
| EP | 1628048 | | 2/2006 |
| JP | H10-114272 A | | 5/1998 |
| JP | 2002122236 A | | 4/2002 |
| JP | 2009184442 | * | 8/2009 |
| JP | 2009184442 A | | 8/2009 |
| JP | 2010121762 A | | 6/2010 |
| WO | 0064704 | | 11/2000 |

OTHER PUBLICATIONS

International Search Report for International application No. PCT/EP2012/067234 dated Aug. 2, 2013.

* cited by examiner

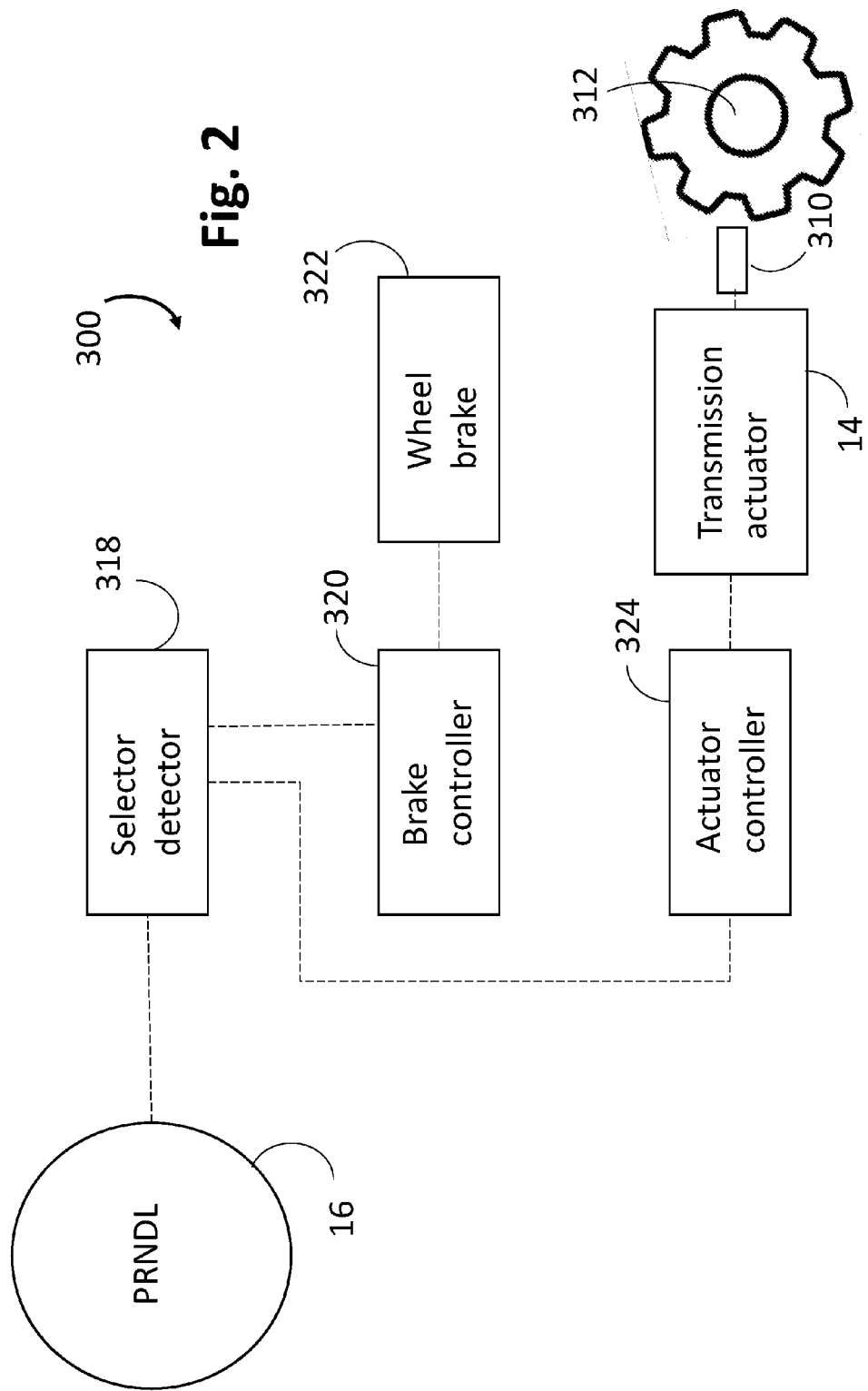

VEHICLE TRANSMISSIONS HAVING A PARK FUNCTION

This invention relates to vehicle transmissions having a park lock function, and more particularly but not exclusively to automatic epicyclic transmissions. Aspects of the invention relate to a method, to a system, to a transmission and to a vehicle.

BACKGROUND

A conventional automatic transmission of a vehicle comprises a plurality of clutches and/or brakes, operable in conjunction with one or more epicyclic gear trains to provide a range of speed ratios. Typically a 'park' function is provided whereby an output shaft of the transmission is engageable with the gearbox casing to lock the transmission output shaft against relative rotation. The driveline downstream of the transmission is uninterrupted, so that engagement of the park function locks the vehicle wheels against movement.

A conventional driver-operated manual selector for such a transmission typically has the positions PRNDL in sequence, so that the park condition is at one end of those positions. The vehicle ignition switch is usually inhibited unless the transmission is in PARK or NEUTRAL, so that there is no danger of being able to start the vehicle engine with the transmission in gear.

A common means of providing the park lock function comprises a toothed wheel of the output shaft and a pivotable pawl mounted on the gearbox casing and resiliently urged into engagement between adjacent teeth of the toothed wheel. The pawl is disengaged by movement of the manual selector away from the PARK position.

It must be assured that the pawl will engage and disengage from the toothed wheel under all conditions of use. In particular disengagement must be reliable even if the output shaft has torque applied to it from the driven vehicle wheels.

Such a circumstance may occur if the vehicle is stopped on an incline, and the park pawl is engaged to hold the vehicle against movement without application of the handbrake. The park pawl stops the vehicle rolling away, and thus reacts to torque in the driveline.

In another circumstance PARK may be selected before the vehicle has ceased moving, and the park pawl may engage the toothed wheel as the vehicle handbrake is applied. In this case the pawl may trap torque within the driveline.

If torque is trapped or reacted to by the park pawl, it must nevertheless not prevent disengagement of the pawl at a reasonably low disengagement force. A known phenomenon includes rapid ejection of the pawl as a disengagement force is applied, which may be a consequence of the trapped torque. Such ejection is typically accompanied by an audible noise (e.g., "pawl thump").

Internal measures may be applied to the transmission to solve the problem of such pawl thump, but the phenomenon may not be predictable or repeatable. It may for example be affected by a variable quality of transmission lubrication, slight variation in manufacturing tolerances, or wear and tear.

It would be desirable to find a solution for eliminating pawl thump, which does not require measures to be applied internal to the transmission casing.

SUMMARY

An illustrative example method of engaging a park pawl of a vehicle transmission includes commanding engagement of the park pawl,
braking wheels of the vehicle against movement,
automatically engaging a neutral condition of the transmission, and
engaging the park pawl after a pre-determined delay.

Another illustrative example method of engaging a park pawl of a vehicle transmission includes
commanding engagement of the park pawl,
braking wheels of the vehicle against movement; and
momentarily engaging a neutral condition of the transmission prior to engagement of the park pawl.

These methods may comprise successive steps.

These methods include a time delay to separate the engagement of the park pawl from commanding such engagement. During the delay the wheels of the vehicle are braked to prevent movement of the vehicle, and neutral is engaged to permit the driveline to settle so that no residual torque is retained. Typically wheels associated with the handbrake are braked, for example using wheel brakes or a transmission brake in the driveline downstream of the transmission. After a sufficient settling period, the park pawl is engaged. The pre-determined delay is typically less than one second, and in one embodiment is around 330 MS.

The methods may include the step of braking the vehicle wheels automatically, for example by applying an electric park brake (EPB) of the vehicle by command from a suitable detector of a transmission selector.

After engagement of the park pawl, the vehicle wheel brake may be automatically released. While this arrangement prevents the park pawl from trapping torque through early engagement, it does not prevent subsequent torque loading of the pawl due to an incline. Accordingly in one embodiment the wheel brake does not automatically release upon engagement of the park pawl.

The methods of the invention may be initiated as the selector leaves the position next to 'PARK' (e.g., when the selector moves from the REVERSE position) or may be initiated as the PARK position is reached. It will be understood that a suitable detector can be provided at any location of the selector which is associated with movement to the PARK position.

An illustrative example control system is for a vehicle automatic transmission having a park pawl engageable with an output shaft. The control system includes a selector for commanding a condition of the transmission and a transmission actuator responsive to the selector to engage the commanded condition. The control system comprises a selector detector to detect selection of a park condition, a brake controller to command application of a vehicle wheel brake, and an actuator controller to command the transmission actuator to momentarily engage and hold a neutral condition of the transmission prior to engagement of the park pawl.

Another illustrative example control system for a vehicle automatic transmission having a park pawl engageable with an output shaft includes a selector for commanding a condition of the transmission, a transmission actuator responsive to the selector to engage the commanded condition, a selector detector to detect selection of a park condition, and a brake controller to command application of a vehicle wheel brake, and an actuator controller to command the transmission actuator. Upon selection of a park condition, the control system is arranged to brake the wheels of the vehicle against movement, engage a NEUTRAL condition of the transmission, and engage the park pawl after a pre-determined delay.

Typically engagement of the park pawl occurs based on a single continuous movement of the selector that is too fast to momentarily engage REVERSE when moving from NEUTRAL toward PARK. Such movement is equivalent to a conventional arrangement having direct movement of the transmission selector.

A conventional automatic transmission typically has a mechanical condition selector in the form of a selector shaft passing through the transmission casing, for causing the transmission to adopt one of its operating conditions (e.g. PRNDL). The input shaft may be rotary or linear, and is typically coupled directly to a drivers manual selector via a mechanical linkage. A time delay may be provided by a dash pot or a similar device in order to delay engagement of the park pawl according to an embodiment of the invention.

In an embodiment of the invention PARK is selected remotely. Thus. for example, a conventional manual selector/linkage may be replaced by an actuator responsive to a command signal. In one embodiment an electronic signal commands an electric actuator, for example a stepper motor, which in turn is coupled to the mechanical selector shaft.

Remote selection of park permits control of the transmission from the dashboard or steering wheel by, for example, electric switches. Such an arrangement also obviates the usual mechanical linkage and thus avoids constraints associated with providing a path for a linkage. Greater design freedom is the desirable consequence.

A particular advantage of remote operation is that a delay may be provided in the signal transmission path with relative ease, such as by a microprocessor electronically delaying operation of an actuator of the transmission upon receipt of a command to engage PARK.

Remote operation is typically by a slave actuator mounted on the transmission casing and operable to directly move the selector input shaft.

In one embodiment of the invention the delay may be adjustable or selectable according to vehicle specification or condition of use. Thus, if necessary, the delay may be set according to an equipment specification of a base vehicle, or may be set in use, for example according to vehicle loading. In the latter case a lightly loaded vehicle may be treated differently than a vehicle at maximum load.

The driver control for remote operation of the transmission may comprise a rotary selector which retracts to an inoperable condition on switching off of the vehicle engine. According to an aspect of the invention, such a selector retracts upon engagement of a park pawl rather than upon selection of 'PARK'. Any suitable means of indicating such engagement is possible, for example an electronic detector of the position of the park pawl relative to the transmission casing.

Within the scope of this document the various aspects, embodiments, examples, features and alternatives set out in the preceding paragraphs, in the claims, or in the following description and drawings may be taken independently or in any combination. For example, features described in connection with one embodiment are applicable to all embodiments except where there is incompatibility of such features with a particular embodiment.

One or more embodiments of the present invention will now be described, by way of example only, with reference to the accompanying drawings.

BRIEF DESCRIPTION OF THE DRAWINGS

FIG. 2 schematically illustrates a control system designed according to an embodiment of this invention.

DETAILED DESCRIPTION

Figure 1:
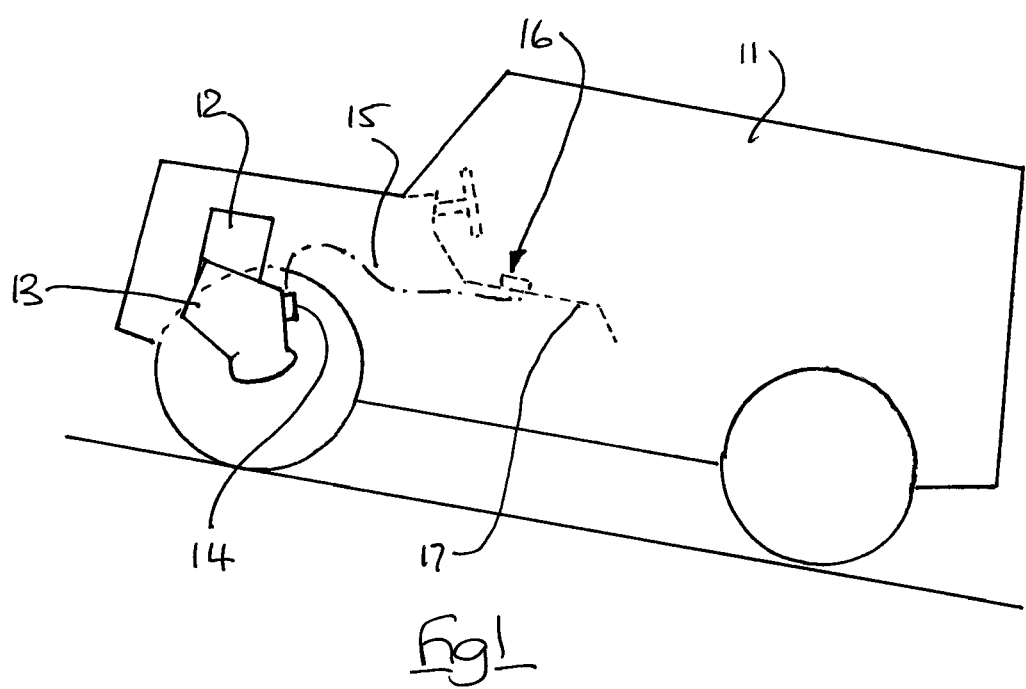
FIG. 1 schematically illustrates a vehicle incorporating an embodiment of the present invention.

With reference to FIG. 1 a vehicle 11 has an engine 12 and a front wheel drive automatic transmission 13. The selector input shaft of the transmission 13 is coupled to an electric actuator 14 mounted on the transmission casing, and is controlled via an electric cable 15 extending to a rotary selector 16 mounted on a vehicle console 17 in the vehicle interior.

An illustrative example control system 300 is for the vehicle automatic transmission having a park pawl 310 that is engageable with an output shaft 312 of the transmission. The control system 300 includes the selector 16 for commanding a condition of the transmission and the transmission actuator 14 responsive to the selector 16 to engage the commanded condition. The control system comprises a selector detector 318 to detect selection of a park condition, a brake controller 320 to command application of a vehicle wheel brake 322, and an actuator controller 324 to command the transmission actuator 14 to momentarily engage and hold a neutral condition of the transmission prior to engagement of the park pawl 310.

As illustrated the vehicle 11 is on a slope, and accordingly it will be appreciated that torque is applied to the transmission park pawl 310 if the vehicle wheel brake 322, which may be a parking brake, is not applied or is ineffective. Release of the pawl 310, even if the vehicle brake 322 is in the meantime applied, is thus under torque loading, and may be rapid, which results in a typically audible noise as the pawl 310 thumps against an abutment in the released condition. As noted earlier, torque may also be trapped due to early engagement of the park pawl 310 and wind-up of the transmission; this leads to the same pawl thump release phenomenon.

In the invention selection of PARK via the rotary selector 16 does not immediately cause the park pawl 310 to engage. The brake controller 320 is commanded to engage an electronic park brake (e.g., the brake 322), and the actuator 14 is commanded to engage or hold the transmission 13 in NEUTRAL for a short period, typically less than 500 milliseconds before allowing the park pawl 310 to engage. This delay, while the vehicle park brake is engaged, allows any residual torque in the transmission to dissipate. The vehicle park brake 322 may be associated with a driven or non-driven axle.

If the selector 16 is in DRIVE, the actuator 14 is commanded to pause in neutral while the selector is manually moved from DRIVE to PARK. If the selector 16 is in REVERSE, the actuator 14 is commanded to shift into NEUTRAL and pause, while the selector 16 is manually moved from REVERSE to PARK. The final movement of the actuator 14 from NEUTRAL to PARK passes through the REVERSE position, but is sufficiently rapid to avoid engagement of the REVERSE speed ratio—such rapid motion is conventional.

It will be appreciated that in selecting PARK from REVERSE, the actuator 14 is commanded to first move away from the PARK condition towards NEUTRAL. This motion is momentary, and should be imperceptible to the vehicle driver.

Thus the invention can avoid trapping residual torque in the transmission driveline, and so long as the vehicle park brake 322 is effective and can eliminate park pawl thump as PARK is disengaged.

This invention is described with reference to an automatic transmission 13 having a conventional PRNDL selector 16. However it will be understood that the principle of the invention is applicable to any transmission having a park lock function and a neutral condition. The invention is also applicable to rear wheel drive and all wheel drive vehicles, and to vehicles having an automated manual transmission with a park function.

Typically functionality of the invention is provided in an electronic control unit of the vehicle responsive to the selection of the transmission condition, and commanding operation of an appropriate actuator. Such a control unit is conventional, and may include logic elements to ensure appropriate command of the actuator upon selection of the park function.

The invention claimed is:

1. A method of engaging a park pawl of a transmission of a vehicle, the method comprising:
    commanding engagement of the park pawl with an output shaft of the transmission;
    braking wheels of the vehicle against movement in response to said commanding engagement of the park pawl with the output shaft of the transmission;
    engaging a NEUTRAL condition of the transmission in response to said commanding engagement of the park pawl with the output shaft of the transmission; and
    engaging the park pawl with the output shaft of the transmission after a pre-determined delay, wherein the delay is from said engaging the NEUTRAL condition of the transmission or from said commanding engagement of the park pawl with the output shaft of the transmission, wherein braking the wheels of the vehicle wheel is during the delay and the transmission is in the NEUTRAL condition during the delay.

2. A method according to claim 1, wherein a duration of said pre-determined delay is selected based on a vehicle condition.

3. A method according to claim 1, wherein a vehicle wheel brake is applied automatically to achieve said braking wheels of the vehicle against movement.

4. A method as claimed in claim 1, wherein the transmission is maintained in the NEUTRAL condition for at least the duration of the pre-determined delay.

5. A method as claimed in claim 1, wherein said braking of the wheels is maintained at least until said park pawl is engaged with the output shaft of the transmission.

6. A control system for an automatic transmission of a vehicle having a park pawl engageable with an output shaft of the transmission, said control system comprising:
    a selector for commanding a condition of the transmission;
    a transmission actuator responsive to the selector to engage the commanded condition;
    a selector detector to detect selection of a PARK condition as the commanded condition;
    a brake controller to command application of a vehicle wheel brake; and
    an actuator controller to command the transmission actuator,
    wherein, upon selection of the PARK condition as the commanded condition:
    the control system gives a command for engagement of the park pawl with the output shaft of the transmission;
    in response to selection of the PARK condition as the commanded condition, the brake controller commands application of the vehicle wheel brake to brake the wheels of the vehicle against movement;
    in response to selection of the PARK condition as the commanded condition, the actuator controller controls the transmission actuator to cause engagement of a NEUTRAL condition of the transmission; and
    the control system causes engagement of the park pawl with the output shaft of the transmission after a pre-determined delay, wherein the delay is from said engagement of the NEUTRAL condition or from said command for engagement of the park pawl with the output shaft of the transmission, wherein the application of the vehicle wheel brake is during the delay and the transmission is in the NEUTRAL condition during the delay.

7. A control system according to claim 6, wherein said brake controller is configured to command application of the vehicle wheel brake when said selector is detected to have a PARK position corresponding to the PARK condition.

8. A control system according to claim 6, wherein said transmission actuator is configured to engage and hold said NEUTRAL condition for a period of 1 second or less.

9. A control system according to claim 8, wherein said period is less than 0.5 seconds.

10. A control system according to claim 9, wherein said period is less than 0.35 seconds.

11. A control system according to claim 8, wherein a duration of said period is selected based on a vehicle condition.

* * * * *

UNITED STATES PATENT AND TRADEMARK OFFICE
CERTIFICATE OF CORRECTION

PATENT NO. : 9,821,775 B2
APPLICATION NO. : 14/342836
DATED : November 21, 2017
INVENTOR(S) : Richard Clarke, Simon Sutton and Kevin Holt Page 1 of 1

It is certified that error appears in the above-identified patent and that said Letters Patent is hereby corrected as shown below:

In the Claims

In Claim 1, Column 5, Line 32-33; replace "the wheels of the vehicle wheel" with --the wheels of the vehicle--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*